(12) United States Patent
Srinivas et al.

(10) Patent No.: US 12,086,138 B2
(45) Date of Patent: *Sep. 10, 2024

(54) GRAPH DATABASE APPLICATIONS

(71) Applicant: INTUIT INC., Mountain View, CA (US)

(72) Inventors: Sudhir Srinivas, Fremont, CA (US); Kevin Geraghty, Dublin, CA (US)

(73) Assignee: INTUIT INC., Mountain View, CA (US)

(*) Notice: Subject to any disclaimer, the term of this patent is extended or adjusted under 35 U.S.C. 154(b) by 267 days.

This patent is subject to a terminal disclaimer.

(21) Appl. No.: 17/225,556

(22) Filed: Apr. 8, 2021

(65) Prior Publication Data
US 2021/0224263 A1 Jul. 22, 2021

Related U.S. Application Data

(63) Continuation of application No. 16/271,729, filed on Feb. 8, 2019, now Pat. No. 10,984,001.

(51) Int. Cl.
| | |
|---|---|
| *G06F 16/24* | (2019.01) |
| *G06F 16/2455* | (2019.01) |
| *G06F 16/25* | (2019.01) |
| *G06F 16/901* | (2019.01) |
| *G06F 3/0482* | (2013.01) |

(52) U.S. Cl.
CPC ........ *G06F 16/2455* (2019.01); *G06F 16/252* (2019.01); *G06F 16/9024* (2019.01); *G06F 3/0482* (2013.01)

(58) Field of Classification Search
CPC ............... G06F 16/2455; G06F 16/252; G06F 16/9024; G06F 3/0482
USPC ....................................................... 707/769
See application file for complete search history.

(56) References Cited

U.S. PATENT DOCUMENTS

| | | | | |
|---|---|---|---|---|
| 6,247,000 | B1* | 6/2001 | Hawkins | G06Q 40/04 |
| | | | | 705/37 |
| 7,480,719 | B2* | 1/2009 | Inoue | H04L 41/5009 |
| | | | | 709/228 |
| 8,122,061 | B1* | 2/2012 | Guinness | G06F 16/211 |
| | | | | 706/11 |
| 8,443,005 | B1 | 5/2013 | Goldman | |
| 9,342,351 | B1* | 5/2016 | Dee | G06F 9/466 |
| 9,785,957 | B2* | 10/2017 | McCormack | G06F 16/2291 |
| 9,811,866 | B1 | 11/2017 | Goldman | |
| 10,417,679 | B1 | 9/2019 | Furbish et al. | |
| 10,719,786 | B1 | 7/2020 | Treseler et al. | |

(Continued)

*Primary Examiner* — Hanh B Thai
(74) *Attorney, Agent, or Firm* — Patterson + Sheridan, LLP

(57) ABSTRACT

Certain aspects of the present disclosure provide techniques for interacting with a graph database structure. In one embodiment, a method includes receiving, at an application, information regarding a first entity; transmitting, to a graph database, a query regarding the first entity; receiving, at the application, query results based on one or more relationships between the first entity and other entities in the graph database; making, by the application, an inference based on the query results; modifying, by the application, a user interface of the application based on the inference by displaying at least one user interface element suggesting a selection of an application option; and receiving, by the application, a user selection of the suggested application option.

18 Claims, 5 Drawing Sheets

(56) References Cited

U.S. PATENT DOCUMENTS

| | | | |
|---|---|---|---|
| 10,728,307 B2* | 7/2020 | Wuest | G06N 5/00 |
| 10,922,493 B1* | 2/2021 | Das | G06F 40/30 |
| 2005/0278220 A1* | 12/2005 | Hahn-Carlson | G06Q 40/12 |
| | | | 705/16 |
| 2006/0074970 A1* | 4/2006 | Narayanan | G06F 11/3476 |
| | | | 707/999.102 |
| 2008/0059351 A1* | 3/2008 | Richey | G06Q 20/20 |
| | | | 705/35 |
| 2010/0076994 A1* | 3/2010 | Soroca | G06F 16/68 |
| | | | 707/769 |
| 2010/0145857 A1* | 6/2010 | Davila | G07F 19/211 |
| | | | 705/44 |
| 2010/0145902 A1* | 6/2010 | Boyan | G06F 16/958 |
| | | | 715/810 |
| 2010/0274691 A1* | 10/2010 | Hammad | G06Q 20/3221 |
| | | | 705/30 |
| 2010/0306249 A1* | 12/2010 | Hill | G06F 16/9535 |
| | | | 707/769 |
| 2012/0330769 A1* | 12/2012 | Arceo | G06Q 20/4014 |
| | | | 455/411 |
| 2013/0041792 A1 | 2/2013 | King et al. | |
| 2013/0166370 A1 | 6/2013 | Weber et al. | |
| 2015/0012422 A1 | 1/2015 | Ceribelli et al. | |
| 2015/0254350 A1* | 9/2015 | Lightner | G06F 16/907 |
| | | | 707/706 |
| 2015/0331877 A1 | 11/2015 | Lou et al. | |
| 2016/0042385 A1* | 2/2016 | Blackhurst | G06Q 30/0242 |
| | | | 705/14.41 |
| 2016/0071087 A1 | 3/2016 | Mittal | |
| 2016/0164880 A1* | 6/2016 | Colesa | G06F 21/53 |
| | | | 726/1 |
| 2016/0275495 A1* | 9/2016 | Sharan | G06Q 20/38 |
| 2017/0228402 A1 | 8/2017 | Kumar et al. | |
| 2017/0236079 A1 | 8/2017 | Venna et al. | |
| 2017/0287090 A1 | 10/2017 | Hunn et al. | |
| 2017/0316057 A1* | 11/2017 | Gordon | G06F 16/212 |
| 2018/0053098 A1* | 2/2018 | Beller | G06N 5/022 |
| 2018/0285480 A1* | 10/2018 | Standefer, III | G06F 16/9038 |
| 2018/0315141 A1 | 11/2018 | Hunn et al. | |
| 2019/0052701 A1* | 2/2019 | Rathod | H04L 67/10 |
| 2019/0102430 A1* | 4/2019 | Wang | G06N 7/01 |
| 2019/0303266 A1* | 10/2019 | Bonnell | G06F 11/302 |
| 2020/0258630 A1 | 8/2020 | Invanoff et al. | |

\* cited by examiner

GRAPH DATABASE APPLICATIONS

CROSS-REFERENCE TO RELATED APPLICATIONS

This Application is a continuation of and hereby claims priority under 35 U.S.C. § 120 to pending U.S. patent application Ser. No. 16/271,729, filed on Feb. 8, 2019, the entire contents of which are incorporated herein by reference.

INTRODUCTION

Aspects of the present disclosure relate to application interactions with graph database structures, such as unified knowledge graphs.

Organizations may rely on graph databases to capture information regarding their customers. In a graph database structure, various entities (e.g., vendors, merchants, employees, etc.) may be represented by nodes and each relationship between entities may be represented by an edge between the entities' nodes.

As graphs grow in entity and relationship (i.e., node and edge) count, the complexity of the graph increases rapidly. In fact, it is not unusual for an organization's graph database to have millions of entities and relationships. Unfortunately, the complexity of such graph databases reduces the performance of such databases when used for information retrieval, and makes it difficult to use the graph databases for application functions. Thus, many organization's graph databases are used only for information storage, and not to support any customer-facing application features.

Accordingly, what is needed are improved graph database structures that can be leveraged to provide useful application features to application users.

BRIEF SUMMARY

Certain embodiments provide a method for interacting with a graph database structure. In one embodiment, the method includes receiving, at an application, information regarding a first entity; transmitting, to a graph database, a query regarding the first entity; receiving, at the application, query results based on one or more relationships between the first entity and other entities in the graph database; making, by the application, an inference based on the query results; modifying, by the application, a user interface of the application based on the inference by displaying at least one user interface element suggesting a selection of an application option; and receiving, by the application, a user selection of the suggested application option.

Other embodiments provide a processing system configured to perform the aforementioned method for interacting with a graph database structure as well as other methods described herein. Further embodiments provide a non-transitory computer-readable medium comprising instructions that, when executed by a processor of a processing system, cause the processing system to perform the aforementioned method for interacting with a graph database structure as well as other methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
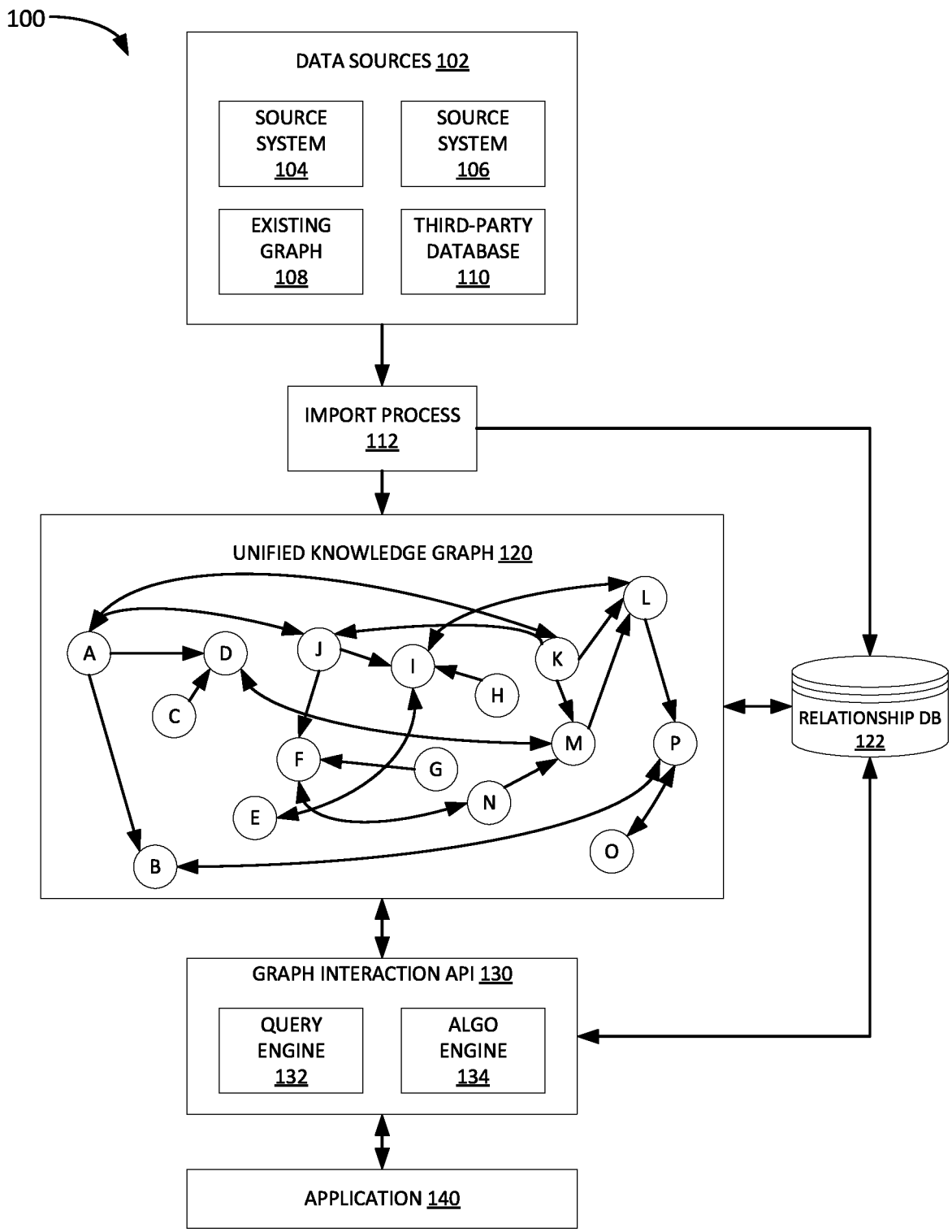
FIG. 1 depicts an example unified knowledge graph system.

Aspects of the present disclosure provide apparatuses, methods, processing systems, and computer readable mediums for interacting with graph database structures, such as unified knowledge graphs.

The inherent structure of a graph database, which links entity nodes by relationship edges, makes the graph database a useful structure for an organization to provide services to users. For example, graph databases may help an organization discover connections between its customers (e.g., between small businesses using related financial management applications), which the organization may then use to facilitate collaboration between its customers, identify new business opportunities for its customers, provide specialized services to its customers, etc. Such customized opportunities provide significant value to the organization's customers and thus significant business opportunity for the organization.

One way in which an organization may offer customized solutions to its customers is by customizing the payment process between its customers. For example, a first user of a financial management application offered by the organization may wish to send an invoice to a second user of the financial management application. Conventionally, the first user may just generate an invoice and send it to the second user by some suitable means. By contrast, as described further herein, an organization may leverage a graph database structure, such as a unified knowledge graph, to improve a user's experience with an application, such as by making customized recommendations based on relationship data stored within the unified knowledge graph. For example, while the first user is generating an invoice for a second user, the underlying application may discover relationships between the second user and other users with which the second user transacts business and, based on these discovered relationships and the related transactions, the application may determine that the second user prefers to pay invoices using a specific payment method, or pays faster using a specific method, or the like. The application may then leverage this determination to make suggestions to the first user to customize the invoice with a particular payment method that the second user prefers. This insight derived from the unified knowledge graph may result in faster payment of the invoice, benefiting the first user, and easier and/or more convenient payment of the invoice, benefiting the second user, and an otherwise improved transaction between the first and second users, which benefits the organization by endearing the first and second users to the financial management application.

Graph Databases Structures

A graph database organizes data using graph structures, such as nodes, edges, and properties of the nodes and edges.

Nodes may represent entities such as people, businesses, accounts, events or any other discrete instance. In some cases, nodes are referred to alternatively as vertices or entities of the graph structure.

Edges, also referred to as graphs or relationships, connect nodes to other nodes (often depicted as lines between nodes), and represent the relationship between them. The relationships allow data in the graph database structure to be linked together directly, and in many cases retrieved with fewer operations as compared to conventional database structures.

Edges may either be undirected or directed. In an undirected graph, an edge from a node to another node may have a single meaning, whereas in a directed graph, the edges connecting two different nodes have different meanings depending on their direction. Thus, edges are a key concept in graph databases, representing an abstraction that is not directly implemented in a relational model or a document-store model.

Properties may be information about or otherwise relevant to nodes and/or edges. In some cases, properties may be referred to as attributes, features, or metadata associated with the nodes and/or edges. For example, a node representing a business entity may include many properties, such as "name", "address", "notes", etc. Similarly, an edge between a customer node and the business node also include properties, such as a specific ID relating the two entities, a directionality of the relationship, a date upon which the relationship was established, and others.

Querying relationships within a graph database is generally fast because they are inherently stored within the structure of the graph database. Further, relationships between entities (e.g., nodes) in graph databases can be intuitively visualized, making it useful for heavily interconnected data. More generally, meaningful patterns may emerge when examining the connections and interconnections of nodes, properties, and edges.

Example Unified Knowledge Graph System

FIG. 1 depicts an example unified knowledge graph system 100.

Key to the ability to build rich graph databases is the ability to ingest data from many data sources, such as data sources 102. In this example, data sources 102 include source system 104 and source system 106, which may be, for example, applications, existing data stores, databases, application-specific data structures, or other data repositories maintained by an organization.

Data sources 102 also include one or more existing graph databases 108. Further, data sources 102 also includes one or more third-party systems or databases 110 or other sorts of data repositories. For example, an organization may have access to third-party databases through application programming interfaces (APIs), shared data channels, shared data repositories, purchased or licensed data sets, or the like.

Notably, the composition of data sources depicted in FIG. 1 is just one example, and any number or type of data source may be imported. Indeed, data sources 102 may be a dynamic mixture of incoming new data sources and outgoing old data sources as data is integrated into unified knowledge graph 120.

Entity data from data sources 102 may be imported by an import process 112 (e.g., by an importing component 512 as in FIG. 5) in one or more native formats and converted to a standardized format for further processing.

For example, the ingested data may be "cleaned", which may refer to identifying incomplete, incorrect, inaccurate or irrelevant parts of the data and then replacing, modifying, or deleting the "dirty" data. Data may be cleaned by removing stop words from a stop word dictionary, removing unsupported or unwanted symbols, fixing misspellings, performing stemming, etc.

Further the ingested data may be normalized so that various attributes are consistently maintained between entities. For example, word replacement may be used to normalize different forms of the same underlying word (e.g., "Incorporated" for "Inc." or "it is" for "it's", etc.). Or, as another example, abbreviations, such as "CA", may be replaced with full words, such as "California".

In some cases, import process 112 may include changing the character of the underlying data, such as the format, file type, encryption type, compression type, etc.

As another example, import process 112 may include disassembling existing combined data structures into component data structures so that the further processing is performed on discrete data units. For example, a source database may be processed one row at a time.

As yet another example, import process 112 may include standardizing imported attributes or fields based on recognized attribute types. For example, address attributes may be passed through an address standardizer/geocoding process that ensures the resulting attribute data adheres to a standardized address format, which may include textual addresses or geographic coordinates as just a few examples.

Because of the potentially dynamic nature of data sources 102 (as described above), import process 112 serves an important function by avoiding the need to reconfigure further processing components for each new data source. Rather, further processing steps may be modularly added to system 100 and configured to accept standardized data output from import process 112.

While performing import process 112, relationships in the underlying data may be captured and recorded, such as in relationship database 122. For example, entity data may include contact records, sales receipts, invoices, contracts, payments, transaction records, or other data that reflects relationships between that entity and other entities. Further, where data being imported is from an existing graph database, such as 108, entity data may include one or more existing relationships. Both existing and determined relationships may be captured in relationship database 122 as part of the import process 112.

In some implementations, import process 112 includes disambiguation of imported entity data to resolve specific entities. Disambiguation of imported data may be particularly useful where data sources 102 includes redundant or related data, such as the same entity existing in source system 104 and existing graph 108.

Disambiguation of entity data may include "blocking", which limits comparison of entity data by one or more identifiable common attributes. For example, blocking may limit the comparison of entities (e.g., businesses) by common cities (e.g., Mountain View). In this way, the number of pairwise comparisons between entities imported by import process 112 from data sources 102 may be beneficially limited thereby improving performance of system 100.

For example, consider an example where 1,000 business entities from each of 1,000 different cities (i.e., n=1,000,000 total business entities) need pairwise comparison. Without blocking, this requires $1^2=1,000,000,000,000$ (1 trillion)

pairwise comparisons. Even with significant processing resources, this number of comparisons takes a significant amount of time to complete. For example, if each comparison takes 1 microsecond, then the 1 trillion comparisons will require 11.6 days to complete. By contrast, if blocking is implemented based on an attribute such as a common city i.e., where only businesses in the same cite are compared, then only 1,000,000,000 (1 billion) comparisons are needed. At the same sample speed as above (1 microsecond/comparison), the processing completes in 16 minutes. Thus, with blocking, the order where k is the number of blocks. So, of complexity gets divided by the number of blocks i.e., $$\frac{n^2}{k},$$

where k is the number of blocks. So, in this case n2=1,000,000,000,000 (1 trillion) pairwise comparisons divided by k=1,000 blocks=1,000,000,000 (1 billion) resulting comparisons. Thus, blocking can significantly improve the performance of the underlying application as well as the efficiency of the processing system as a whole.

Notably, blocking can be implemented based on any common data attribute of the imported data (e.g., same site, same state, same name, same type, same category, same field, etc.), and in some cases may be applied to only subsets of the imported data where the common attribute exists.

In some implementations, the imported data may be partitioned or bucketed initially before blocking. For example, imported data may be bucketed based on hashes of the data and a MinHash (or the min-wise independent permutations locality sensitive hashing scheme) method may be used for non-deterministic attributes, where MinHash is a technique for quickly estimating the similarity of two sets of data. The buckets may be used as the basis for blocking as described above.

Blocked data sets (e.g., a set of entities all sharing a common characteristic, property, attribute, or the like) may then be matched by a matching process (which may be considered a disambiguation sub-process in this example). Matching involves determining which entities match i.e., are the same entity despite existing as separate entities in the imported data. For example, matching may determine that instances of "Bob's Submarine Shop", "Bob's Subs" and "Bob's Sub Sandwiches" in imported data all refer to the same entity.

Matching can be performed by a variety of methods, including probabilistic methods, such as machine learning methods, as well as deterministic methods, such pairwise comparison, for exact matches, edit distances (e.g., Levenshtein distance), ground truth knowledge, and the like. These different methods may be combined in some examples to improve the quality of the matching. In one implementation, similarity scores from multiple matching methods may input to a machine learning model to learn the best way to combine the scores based on a fully labeled "golden" data set where all the matches are known.

In some implementations, a first cut at matching entities in a blocked data set may include grouping like entities based on one or more matching attributes. For example, entities in a blocked data set may be grouped by location (e.g., neighborhood or zip code), by type (e.g., a type of business), by tax status (e.g., profit vs non-profit), and many other attributes. These initial groupings may improve overall matching by avoiding erroneous matches of very similar, but otherwise distinct entities. For example, different locations of the same business chain, which should be treated as distinct entities despite all their similarities, may be grouped apart based on neighborhood data.

Probabilistic matching methods, such as clustering algorithms (e.g., hierarchical clustering algorithms, centroid-based clustering algorithms, density-based clustering algorithms, and others) may be used to match entities as well. In some cases, a threshold based on the probabilistic method may be established to determine when a match is determined by that method.

In some examples, ensembles of probabilistic methods may be used, for example, to first cluster entities and then to refine the clusters by a second technique, such as measuring edit distances or applying another machine learning algorithm. This refinement may improve the likelihood that matched entities are indeed the same entity.

Relationship database 122 may store relationship information determined during import process 112. For example, relationship database 122 may store rows corresponding to relationships between original entities that have been disambiguated. In some cases, unified knowledge graph 120 may only include a subset of entities as compared to the superset of entities in the imported entity data, and relationship database 122 may provide a mechanism to associate disambiguated entities in unified knowledge graph 120 with original entities from data source 102. In such implementations, storing the data in a separate database, such as relationship database 122, improves the performance of unified knowledge graph 120 (e.g., by reducing the size of unified knowledge graph 120 and thereby increasing query speed) without loss of resolution in data from a system perspective.

In this example, unified knowledge graph 120 includes entities (e.g., A-P) that are each associated with a type. For example, types may include company, vendor, customer, employee, merchant, buyer, and seller, and others. Consequently, a single entity may be represented by multiple nodes in unified knowledge graph 120, and each node associated with the given entity may represent a specific type-context for that entity.

For example, a first node may represent an entity as a first type (e.g., merchant) and reflect all of the entity's relationships with other entities in a first type-specific context (e.g., a set of merchants). Similarly, a second node may represent the entity as a second type (e.g., customer) and reflect all of the entity's relationships with other entities in a second type-specific context (e.g., a set of customers).

In some implementations, relationship database 122 may store relationship information that identifies the same entities in different contexts so that queries to unified knowledge graph 120 may identify all relationships of an entity while maintaining type-specific networks of entities in unified knowledge graph 120.

Unified knowledge graph 120 may be used for many productive ends. For example, application 140 may access unified knowledge graph 120 via graph interaction application programming interface (API) 130. Application 140 may be, for example, a mobile application, desktop application, or web-based application (e.g., run in a client-server architecture). In some examples, application 140 may be a financial management application, personal finance application, accounting application, small business management application, or others.

Graph application API 130 may generally be used to provide standardized interaction capability to applications or other data requesters, such as application 140. In this way, applications need not be programmed to interact with graph databases with different underlying structures or capabilities, but rather only need to be programmed to interact with the standardized graph interaction API 130.

Notably, while graph interaction API 130 is shown as a separate aspect in FIG. 1 (and other figures), it need not be separate. In other implementations, graph interaction API 130 may be integral with a graph database structure, such as unified knowledge graph 120, or unified knowledge graph 120 may be configured to receive requests and provide responses without the need for a specific API.

Figure 5:
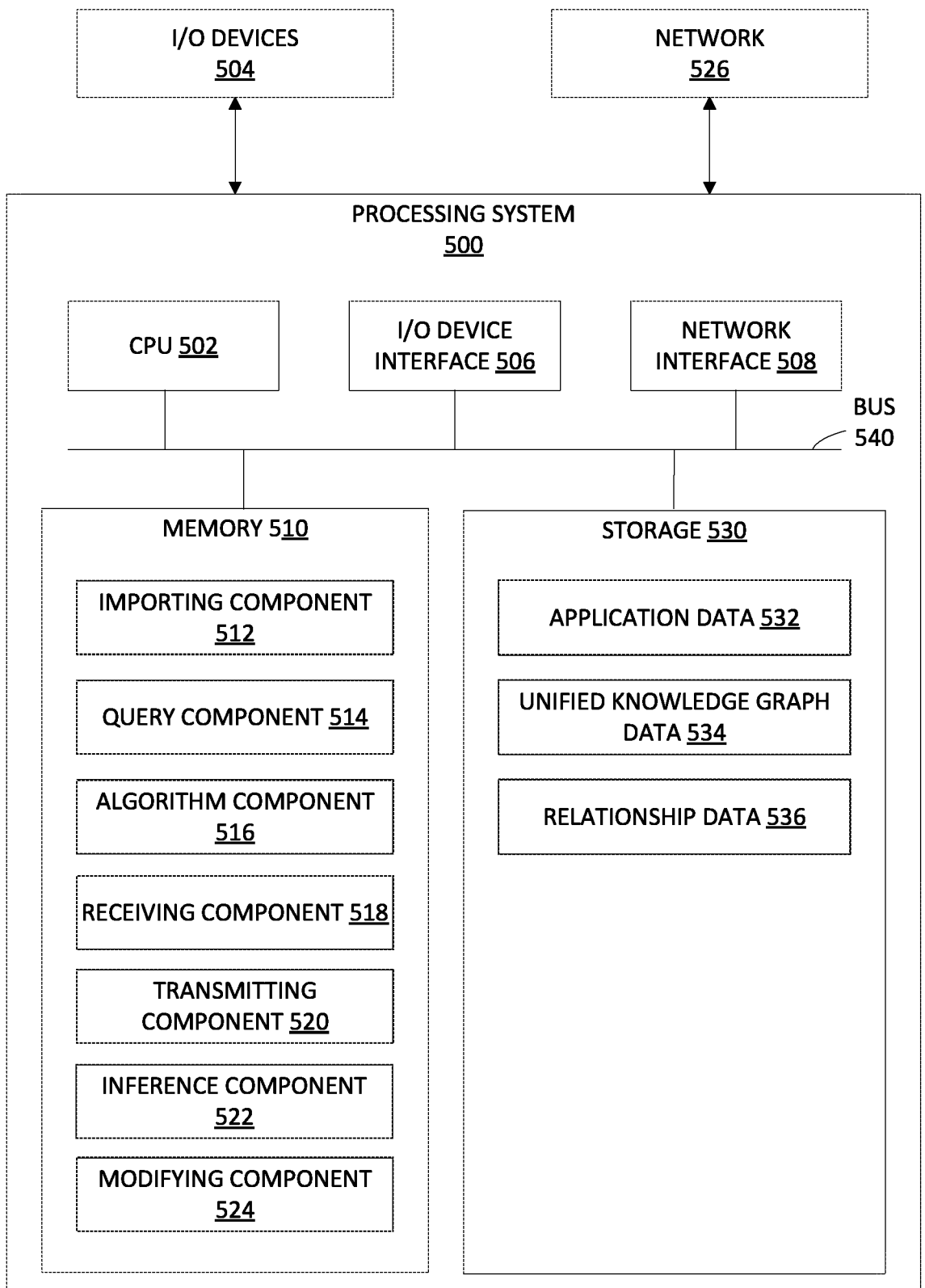
FIG. 5 depicts an example processing system for interacting with graph database structures.

In this example, graph interaction API 130 includes a query engine 132 that allows queries to be run against unified knowledge graph 120 (e.g., by query component 514 in FIG. 5). For example, query engine 132 may query unified knowledge graph 120 to determine relationship information regarding entities in unified knowledge graph 120, to determine groups of related entities, or to discover information associated with relationships between entities. In the context of a financial management application, information associated with relationships between entities may include things such as contact records, sales receipts, invoices, contracts, payments, transaction records, and others. The results of querying unified knowledge graph 120 by query engine 132 may be used by, for example, application 140 to provide services to users of application 140.

In some implementations, graph interaction API 130 may also retrieve information from relationship database 122. For example, if a query to unified knowledge graph 120 includes a parameter requesting information regarding an original entity (e.g., prior to disambiguation), then relationship database 122 may provide that data with the results of the query. Similarly, a query based on an entity that is related to, but does not exist in unified knowledge graph 120, for example an original entity before disambiguation, may be determined with reference to a record stored in relationship database 122 that relates the original entity to the disambiguated entity in unified knowledge graph 120.

In this example, graph interaction API 130 also includes an algorithm engine 134, which may perform algorithmic functions on unified knowledge graph 120 based on a request from an application, such as application 140, or independent of an application (e.g., at the request of an organization maintaining unified knowledge graph 120). For example, algorithms may be run on unified knowledge graph 120 in order to discover or infer additional relationships, patterns of activity, and the like.

In one example, graph algorithms may be used to discover new groups or "communities" of entities in unified knowledge graph 120, or new chains of commerce, and the like. In some cases, algorithms may be able to identify emerging markets between entities and allow an organization to decide to be an early entrant in that emerging market. Other algorithms may be run on unified knowledge graph 120 to identify relationship attributes, such as persistent versus transient relationships in unified knowledge graph 120, and allow an organization to determine interrelationship opportunities between the entities with persistent relationships.

Figure 2:
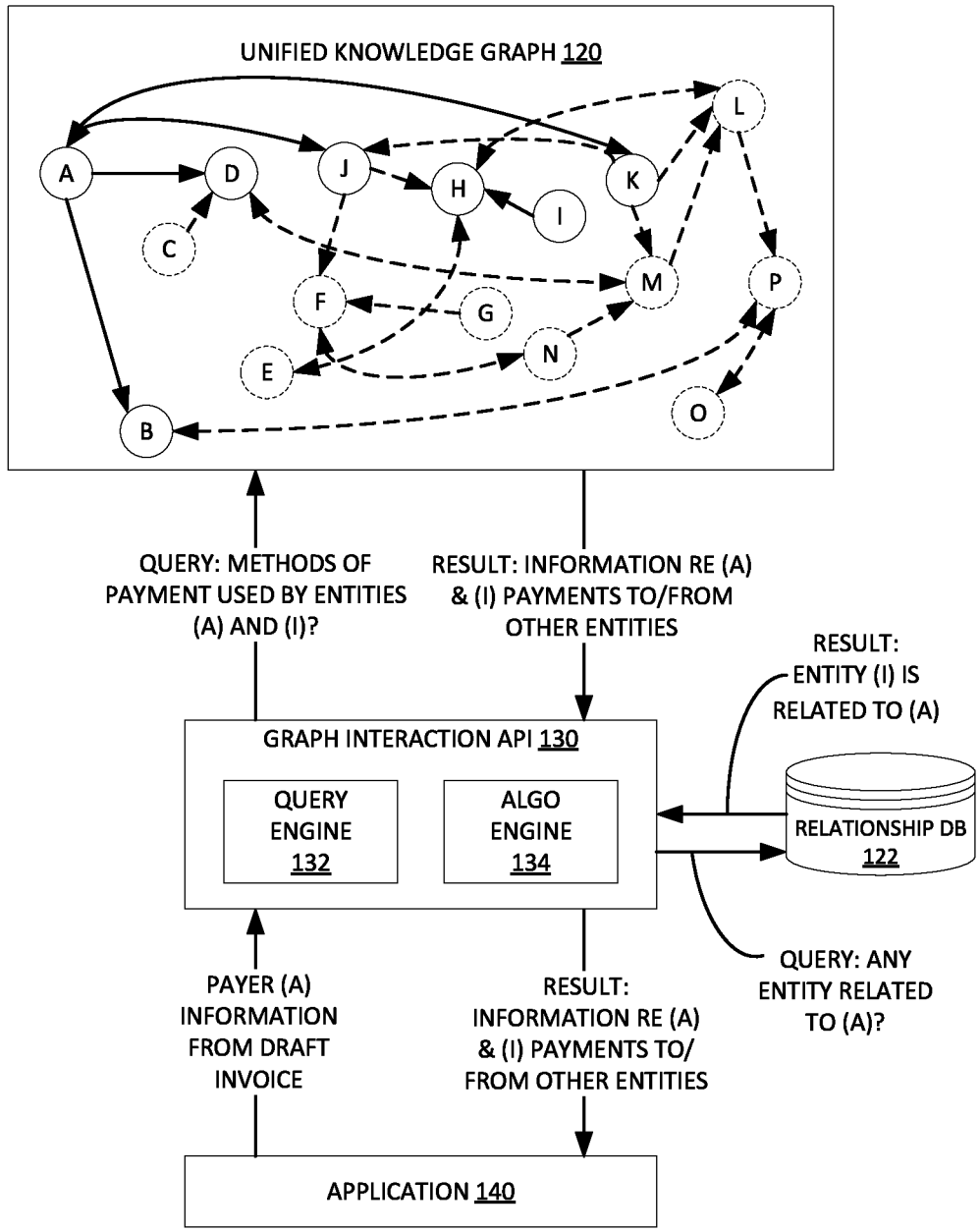
FIG. 2 depicts an example of using a graph database structure to improve an application service.

FIG. 2 depicts an example of using a graph database structure to improve an application service.

In this example, application 140 is a financial management application used by a first user wanting to send an invoice to a second user. The second user may likewise be a user of application 140.

The process starts when the first user begins creating the invoice to the second user within application 140.

In some implementations, application 140 may query unified knowledge graph 120 via graph interaction API 130 and query engine 132 as the first user is entering the second user's contact information in order to provide a list of possible known entities in unified knowledge graph 120. An example of this is depicted and described below with respect to FIG. 3A. In such examples, the first user may select a listed entity to autofill the remainder of the invoice. In some examples, the list of potential entities may be limited by context type (e.g., looking for an entity in unified knowledge graph 120 that is a payer, or customer, or the like). In this example, the first user selects information for the second user, which is associated with node 'A' in unified knowledge graph 120.

Application 140 may then transmit a query including the second user's information (i.e., the invoice payer information) to graph interaction API 130 seeking information regarding how the second user has made payments on other invoices to other entities (e.g., other users) in unified knowledge graph 120.

As described above with respect to FIG. 1, in some implementations, unified knowledge graph 120 may include multiple nodes associated with the same entity. In such implementations, application 140 may also indicate in its query (e.g., via a query attribute or parameter) that query engine 132 should also look for any entities related to node 'A', such as other entities corresponding to the second user in different contexts. For example, query engine 132 may look for instances of the second user as a payee or merchant. In other implementations, query engine 132 may be configured to do this automatically.

In this example, query engine 132 queries relationship database 122 and determines that node 'I' and node 'A' relate to the same entity (here, the second user) in different contexts. Based on this determination, query engine 132 queries unified knowledge graph 120 regarding payment instances based on nodes 'A' and 'I'. Query engine 132 then receives results based on both nodes 'A' and 'I', which both correspond to the second user.

In FIG. 2, the solid lines for nodes and edges between nodes indicate the resulting relevant relationships based on the query based on nodes 'A' and 'I' (for which there may be transactions with payment information), and the dotted lines for nodes and edges between nodes indicate no relevance to the query. Notably, in other examples, the query results may be based solely on node 'A' instead, such as where a payment context is used to limit or filter results, or where there are no other nodes related to 'A'.

In this example, the query results received by query engine 132 indicate the different ways in which the second user has paid invoices as a payer associated with node 'A' and how the second user has received payments as a payee associated with node 'I'. These results may be based on transactions associated with relationships between node 'A' and other nodes (shown in solid lines in FIG. 2) and between node 'I' and other nodes (likewise shown in solid lines in FIG. 2). In this example, the query results indicate both the different types of payment methods and the number of instances of each payment method associated with the second user so that payment preferences can be inferred regarding the second user. In other examples, the query results may include additional data, such as the amounts of the transactions associated with each payment method, the amount of time between an invoice and a payment, and others.

The query results in this example may be used to determine or make an inference regarding payment preferences for the second user, such as a preferred payment type (e.g., debit card, credit card, ACH transfer, electronic check, gift card, gift code, electronic currency transfer, or the like), a preferred payment institution (e.g., a particular bank), preferred payment terms, and the like. In some cases, a preferred payment type (e.g., a payment service) may be associated with the organization providing application 140.

As described above, application 140 may determine or infer a payment preference based on the results of the query to unified knowledge graph 120 (via graph interaction API 130 in this example). As depicted and described with respect to FIG. 3B, below, application 140 may use this determination to suggest customizations to the invoice created by the first user. For example, application 140 may suggest preferred payment options in an on-screen message or tip to the first user, or may highlight preferred payment options, or may preselect preferred payment options, just to name a few options.

Note that while shown in this example as a single graph interaction API 130 acting on a single unified knowledge graph 120, in other implementations, there may be multiple graph database structures (e.g., multiple knowledge graphs) accessible via graph interaction API 130 and possibly other APIs.

Figure 3A:
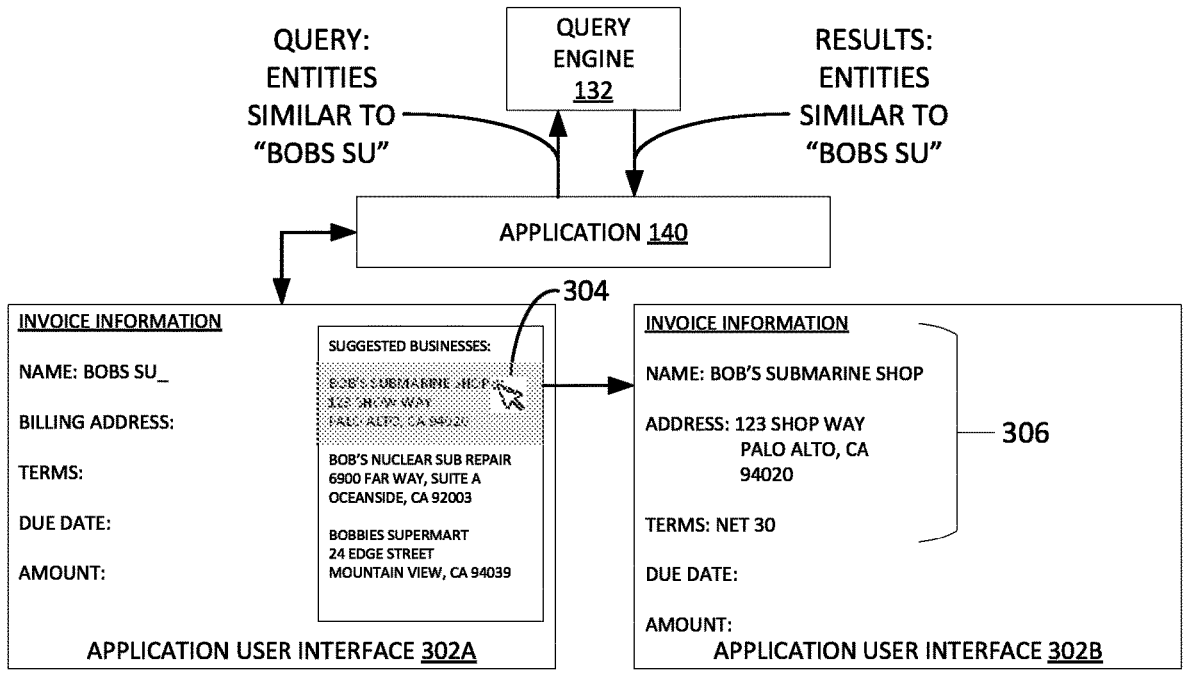
FIG. 3A depicts an example of an application interacting with a graph database structure.

FIG. 3A depicts an example of an application interacting with a graph database structure, such as unified knowledge graph 120 in FIGS. 1 and 2, to improve a user experience with the application.

In this example, as described above, a query engine 132, which may be a part of an graph interaction API (such as graph interaction API 130 in FIGS. 1 and 2), handles interaction between application 140 and a unified knowledge graph (not depicted).

As depicted in application user interface 302A, a user has started to enter invoice information "Bobs Su" regarding a payer, Bob's Submarine Shop. In response, application 140 queries the unified knowledge graph for entities similar to "Bobs Su". In some implementations, a new query may be generated with every new character entry, while in others the query may be based on a wait time after a character entry, or a minimum numbers of characters entered, or an action key (e.g., pressing "Enter"), or the like.

As part of the query to query engine 132, application 140 may include a parameter, indicator, value, or the like indicating that it is looking for an entity in a specific context, such as a payer or customer. In this way, only entities like "Bobs Su" in that specific context (i.e., as a customer or payer) may be returned from the unified knowledge graph. This may be particularly useful when the same entity is associated with multiple nodes in the unified knowledge graph, as described above. For example, if Bob's Submarine Shop is a franchise, there may be one central address for all invoices associated with a customer or payer context, but different addresses associated with different franchises in a merchant or seller context.

Based on the results of the query, application 140 may display options for the user to select (if such options exist). In this case the user may select at 304 the correct entity related to the partial entry "Bobs Su", which in this case is Bob's Submarine Shop in Palo Alto. Once selected, application 140 automatically populates relevant data 306 into user interface 302B, which may be retrieved as entity attribute data from a particular node in the unified knowledge graph.

Figure 3B:
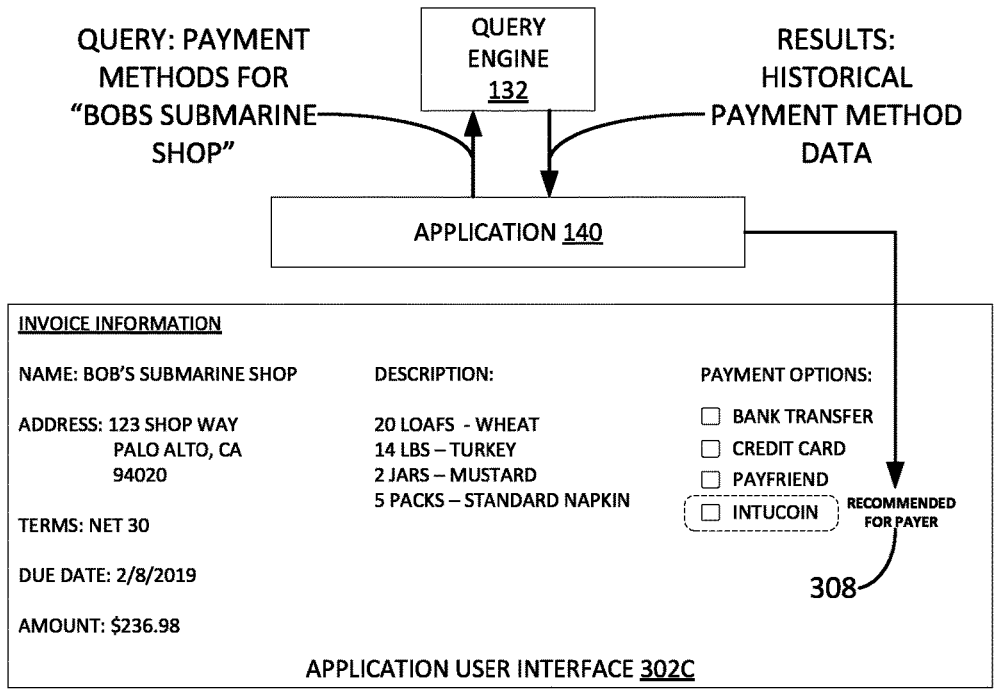
FIG. 3B depicts an example of customizing an invoice based on an interaction with a graph database structure.

FIG. 3B depicts an example of customizing an invoice based on an interaction with a graph database structure, such as unified knowledge graph 120 in FIGS. 1 and 2.

In this example, the user of application 140 has entered additional invoice information in application user interface 302C. The user has not yet chosen a payment option, and several are displayed within application user interface 302C.

Conventionally, a user may have just guessed at the best payment option for the payer (here, Bob's Submarine Shop), or selected an option that was most convenient to the user, but not necessarily most convenient for the payer. This may lead to the payer needing to contact the user to arrange a different payment method, irritation on the part of the payer that it has to set up a new payment method, or the like.

Instead, in this example, application 140 queries a unified knowledge graph for information regarding payment methods that the payer has used in the past. As described above, in some cases, the query may be context limited, such as receiving only information regarding how the payer has paid other users, but not how the payer has been paid in other contexts. In other cases, the query may collect all information regarding payments to and from the payer. Either way, application 140 receives historical payment method data based on relationships in the unified knowledge graph (e.g., based on transaction records between the payer and other entities in the unified knowledge graph), and makes a determination of a recommended payment option as shown at 308.

The recommendation may be based on, for example, a number of instances of different payment methods associated with each unique payment method associated with the payer. So, for example, the historical payment method data may include 19 instances of "bank transfers", 102 instances of "credit card payments", 2 instances of "PayFriend", and 247 instances of "IntuCoin". As "IntuCoin" has the largest number of instances, it may be inferred to be the payer's favorite means of paying, and therefore the recommended 308 means of paying depicted in application user interface 302C. In some cases, the number of instances may be limited to a date range or maximum age of the transaction in order to determine more current results. This may be particularly useful if a new payment method has more recently become a favorite, which might otherwise be skewed by historical results.

In an alternative example, the historical payment method data may show that the payer has received $9,463 in "bank transfers", $15,678 of "credit card payments", $128 of "PayFriend", and $5439 of "IntuCoin". In such an example, the recommendation could instead be based on the highest amount of payments, in which case credit card would be the recommended payment option. As above, the values may be limited to a date range or maximum age of the transaction in order to determine more current results. This may be particularly useful if outlier transactions would tend to skew the value calculation.

In yet another alternative example, the historical payment method data may show that the invoices associated with "bank transfers" takes an average of 2 days to be paid, invoices associated with "credit card payments" take an average of 4 days to be paid, invoices associated with "PayFriend" take an average of 7 days to be paid, and invoices associated with "IntuCoin" take an average of 3 days to be paid. In such an example, the recommendation could instead be based on the shortest time to be paid, in which case bank transfer would be the recommended payment option. As above, the payment times may be limited to a date range or maximum age of the transaction in order to determine more current results.

Returning to the example depicted in FIG. 3B, recommendation 308 includes a user interface element highlighting "IntuCoin" as well as text indicating that "IntuCoin" is "Recommended for Payer". Notably, these are just some examples, and any sort of user interface element and/or text capable of conveying the recommended payment method could be used equally effectively. In some examples, more than one payment method may be recommended, for example, based on a top number (e.g., two) of payment methods used by the payer.

Though not shown in this example, application 140 may further preselect "IntuCoin" as the default payment method, thereby saving the user an additional step.

Once a payment option is selected, such as the recommended payment option in this example, the invoice may be sent from application 140.

Notably, FIGS. 3A and 3B depict different examples of a financial management application interacting with a graph database structure, such as unified knowledge graph 120 in FIGS. 1 and 2, to improve an application experience for a user. Many other examples are possible based on the various types of information stored in the graph database structure. Further, many other types of applications may take advantage of the interaction methods described herein. More broadly, any application may leverage inferences based on a graph database structure to make specific improvements to the functionality of applications, including the user interface and user experience associated with such applications.

Example Method for Interacting with a Graph Database Structure

Figure 4:
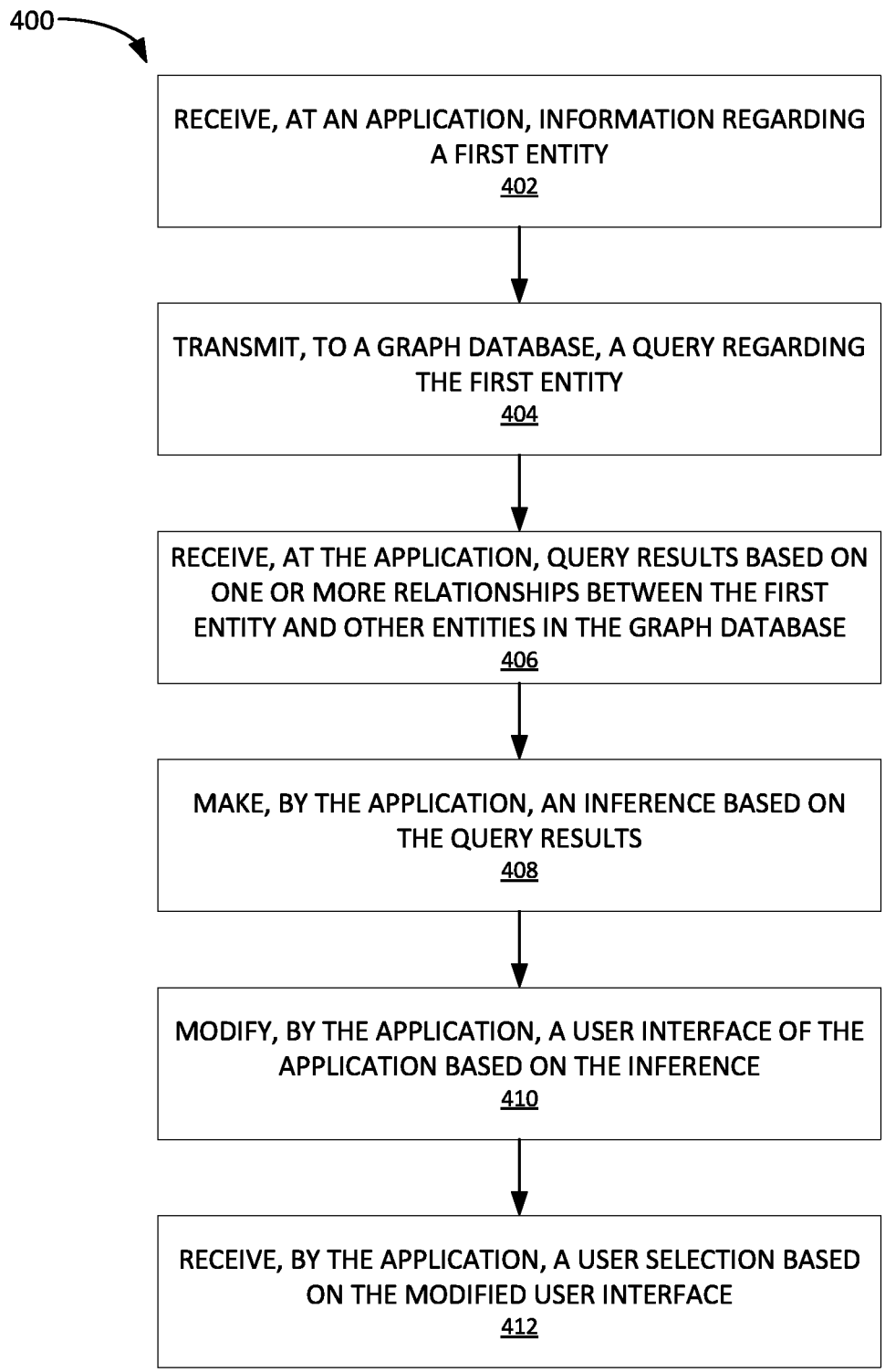
FIG. 4 depicts a method for interacting with a graph database structure.

FIG. 4 depicts a method 400 for interacting with a graph database structure.

In some examples, the graph database comprises a plurality of entities, including the first entity and each entity of the plurality of entities is associated with a type. In some examples, the first entity is associated with a first type, a second entity, related to the first entity, is associated with a second type, and a first set of relationships between the first entity and other entities of the plurality of entities is different than a second set of relationships between the second entity and other entities of the plurality of entities.

In some examples, the graph database structure may be a unified knowledge graph, such as described above with respect to FIGS. 1 and 2.

Method 400 begins at step 402 with receiving, at an application, information regarding a first entity.

Information regarding a first entity could relate to, for example, a property, attribute, feature, or metadata associated with an entity. In the example described above with respect to FIGS. 3A and 3B, information regarding an entity included contact information, such as name and address information, which may be found in a contact record associated with the entity.

The information may be received, for example, via a user interface element, such as a data entry user interface element (e.g. a text box), a selection element, or the like. In other examples, the information may be received by an imaging sensor, such as a camera sensor, which captures information that is then processed (e.g., by an optical character recognition application).

Method 400 then proceeds to step 404 with transmitting, to a graph database, a query regarding the first entity.

In some examples, the query includes an indication to determine any entities related to the first entity. In some examples, the query includes an indication to limit query results to a specific context associated with the first entity.

In some examples, transmitting, to the graph database, the query regarding the first entity further includes transmitting the query to an application programming interface (API) associated with the graph database.

Method 400 then proceeds to step 406 with receiving, at the application, query results based on one or more relationships between the first entity and other entities in the graph database.

In one example, receiving, at the application, the query results further includes receiving the query results from the API associated with the graph database.

The query results may include data based on relationships that exist between the first entity and other entities in the graph database as described above in the example of FIGS. 2, 3A, and 3B. In one example, the query results are further based on one or more relationships between a second entity, related to the first entity, and other entities in the graph database.

Method 400 then proceeds to step 408 with making, by the application, an inference based on the query results. The inference may be a guess or prediction based on a calculation or processing of the data returned with the query results, such as described above with respect to FIG. 3B.

In one example, making, by the application, the inference based on the query results includes determining, based on the query results, a number of instances of each of a plurality of transaction types associated with the first entity, and inferring a preferred transaction type of the plurality of transaction types based on the transaction type of the plurality of transaction types having a greatest number of instances. In some examples, the number of instances of each of the plurality of transaction types may be limited to a certain time frame (e.g., a date range), or limited by a certain maximum age (such as not counting transactions more than a year old).

In another example, making, by the application, the inference based on the query results includes determining, based on the query results, a total value of each of a plurality of transaction types associated with the first entity, and inferring a preferred transaction type of the plurality of transaction types based on the transaction type of the plurality of transaction types having a greatest value. For example, the total value could be a dollar or other currency figure associated with transactions associated with the first entity.

In yet another example, making, by the application, the inference based on the query results includes determining, based on the query results, an average amount of time associated with each of a plurality of transaction types associated with the first entity, and inferring a preferred transaction type of the plurality of transaction types based on the transaction type of the plurality of transaction types having the shortest average time. For example, a certain transaction type (e.g., credit card payment) may have the shortest average invoice payment time as compared to other transaction types (e.g., payment by check or ACH transfer).

Method 400 then proceeds to step 410 with modifying, by the application, a user interface of the application based on the inference.

In some examples, modifying, by the application, the user interface of the application based on the inference further comprises displaying at least one user interface element suggesting a selection of an application option. In other examples, one or more user interface elements such as shape and text elements, may be displayed within the user interface. In another example, one or more user interface elements may be modified in appearance, such as highlighted, bolded, made larger or smaller, or the like in order to emphasize the one or more user interface elements. Combinations of the aforementioned user interface modifications are possible.

Method 400 then proceeds to step 412 with receiving, by the application, a user selection based on the modified user interface.

In one example, receiving, by the application, the user selection based on the modified user interface further comprises receiving a user selection of the suggested application option. In other examples, the selection may be based on a user clicking on a user interface element, or selecting the user interface element via a touchscreen display of a processing device (e.g., a mobile phone), or by the user giving a voice command that is interpreted by the application.

In one example of method 400, the application is a financial management application. In similar examples, the query regarding the first entity may comprise a request for historical payment data associated with the first entity. In similar examples, the query results may comprise historical payment data associated with the first entity. In similar examples, the inference comprises a preferred payment method associated with the first entity. In similar examples, modifying, by the application, the user interface of the application based on the inference further comprises indicating the preferred payment method in the user interface. In similar examples, receiving, by the application, the user selection based on the modified user interface further comprises a selection of the preferred payment method for an invoice. In similar examples, method 400 may further include: transmitting the invoice to the first entity with the selection of the preferred payment method.

Example Processing System

FIG. 5 depicts an example processing system 500 for interacting with graph database structures, such as those described above with respect to FIGS. 1 and 2. For example, processing system 500 may be configured to perform method 400 described with respect to FIG. 4 as well as other operations described herein.

Processing system 500 includes a CPU 502 connected to a data bus 540. CPU 502 is configured to process computer-executable instructions, e.g., stored in memory 510 or storage 530, and to cause processing system 500 to perform methods as described herein, for example with respect to FIG. 4. CPU 502 is included to be representative of a single CPU, multiple CPUs, a single CPU having multiple processing cores, and other forms of processing architecture capable of executing computer-executable instructions.

Processing system 500 further includes input/output device(s) 504 and input/output interface(s) 506, which allow processing system 500 to interface with input/output devices, such as, for example, keyboards, displays, mouse devices, pen input, and other devices that allow for interaction with processing system 500.

Processing system 500 further includes network interface 508, which provides processing system 500 with access to external networks, such as network 526.

Processing system 500 further includes memory 510, which in this example includes a plurality of components.

For example, memory 510 includes importing component 512, which is configured to perform importing functions as described above (e.g., with respect to import process 112 in FIG. 1).

Memory 510 further includes query component 514, which is configured to perform querying functions as described above (e.g., with respect to FIGS. 1, 2, 3A, and 3B).

Memory 510 further includes algorithm component 516, which is configured to perform algorithmic functions as described above (e.g., with respect to FIG. 1).

Memory 510 further includes receiving component 518, which is configured to perform receiving functions as described above (e.g., with respect to FIGS. 1, 2, 3A, and 3B).

Memory 510 further includes transmitting component 520, which is configured to perform transmitting functions as described above (e.g., with respect to FIGS. 1, 2, 3A, and 3B).

Memory 510 further includes inference component 522, which is configured to perform inferring functions as described above (e.g., with respect to FIG. 3B).

Memory 510 further includes modifying component 524, which is configured to perform modifying functions as described above (e.g., with respect to FIG. 3B).

In some examples, receiving component 518, transmitting component 520, inference component 522, and modifying component 524 are all related to an application, such as application 140 described above (e.g., with respect to FIGS. 1, 2, 3A, and 3B).

Note that while shown as a single memory 510 in FIG. 5 for simplicity, the various aspects stored in memory 510 may be stored in different physical memories, but all accessible CPU 502 via internal data connections, such as bus 540.

Processing system 500 further includes storage 530, which in this example includes application data 532, which may be related to an application such as application 140 described above (e.g., with respect to FIGS. 1, 2, 3A, and 3B).

Storage 530 further includes unified knowledge graph data, which may be related to, for example, unified knowledge graph 120 described above with respect to FIGS. 1, 2, 3A, and 3B.

Storage 530 further includes relationship data 536, which may include relationship data such as described above with respect to relationship database 122 in FIGS. 1 and 2.

As with memory 510, a single storage 530 is depicted in FIG. 5 for simplicity, but the various aspects stored in storage 530 may be stored in different physical storages, but all accessible to CPU 502 via internal data connections, such as bus 540, or external connection, such as network interface 508.

Notably, the various aspects of processing system 500, including the components in memory 510 and the data in storage 530 are just one example, and many others are possible consistent with the methods and systems disclosed herein.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for user interface modification, comprising:
receiving information regarding a first entity;
generating based on the information regarding the first entity, a query including an indication to determine a related entity that is related to the first entity by using an inherent structure of a graph database and to retrieve historical data for the related entity in the graph database;
transmitting the query to a graph interaction interface associated with the graph database and a relationship database, wherein:
the graph database and the relationship database were populated by:
receiving the first entity and a different entity from one or more data sources;
determining that the first entity is redundant of the different entity based on comparing entity attributes;
storing the different entity in the graph database and excluding the first entity from the graph database based on the determining that the first entity is redundant of the different entity;
storing relationship information in the relationship database indicating that the first entity does not exist in the graph database and corresponds to the different entity in the graph database;
the graph interaction interface retrieves, based on the query, the relationship information from the relationship database; and
the graph database comprises a plurality of entities including the different entity and a second entity related to the different entity, and the graph database has a reduced graph database size and an increased graph database query speed due to the first entity being excluded from the graph database;
receiving a query result for the different entity and the second entity from the graph database based on the relationship information and at least one relationship between the different entity and the second entity that is indicated by the inherent structure of the graph database including a relation edge linking nodes representing the different entity and the second entity, the query result including the historical data based on the at least one relationship; and
modifying a user interface of an application based on the historical data.

2. The method of claim 1, wherein:
the historical data comprises historical payment data for the related entity;
the method further comprises determining a preferred payment method of the first entity from the historical payment data;
modifying the user interface by selecting the preferred payment method for an option of the user interface; and
transmitting an invoice to the first entity the preferred payment method selected.

3. The method of claim 1, wherein querying the graph database comprises indicating the graph database to limit query results to information regarding entities of the plurality of entities associated with a first type, wherein the second entity is associated with the first type.

4. The method of claim 1, wherein querying the graph database comprises:
transmitting a query to an application programming interface (API) associated with the graph database, and
receiving, at the application, query results from the API associated with the graph database.

5. The method of claim 1, wherein modifying the user interface comprises:
determining, based on the historical data, a transaction type having a shortest average time; and
selecting the transaction type having the shortest average time for an option of the user interface.

6. The method of claim 1, wherein modifying the user interface comprises:
determining, based on the historical data, a transaction type having a greatest number of instances; and
selecting the transaction type having the greatest number of instances for an option of the user interface.

7. The method of claim 1, wherein modifying the user interface comprises:
determining, based on the historical data, a transaction type having a highest amount; and
selecting the transaction type having the highest amount for an option of the user interface.

8. The method of claim 1, wherein,
each entity of the plurality of entities is associated with a type, the first entity is associated with a first type,
the second entity is associated with a second type, and
a first set of relationships between the first entity and other entities of the plurality of entities is different than a second set of relationships between the second entity and other entities of the plurality of entities.

9. The method of claim 1, wherein querying the graph database comprises indicating the graph database to limit query results to historical data associated with a range of dates.

10. A system, comprising:
a memory comprising computer-executable instructions;
a processor configured to execute the computer-executable instructions and cause the system to perform a method for user interface modification, the method comprising:
receiving information regarding a first entity;
generating, based on the information regarding the first entity, a query including an indication to determine a related entity that is related to the first entity by using an inherent structure of a graph database and to retrieve historical data for the related entity in the graph database;

transmitting, based on the information regarding the first entity, the query to a graph interaction interface associated with the graph database and a relationship database, wherein:

the graph database and the relationship database were populated by:

receiving the first entity and a different entity from one or more data sources;

determining that the first entity is redundant of the different entity based on comparing entity attributes;

storing the different entity in the graph database and excluding the first entity from the graph database based on the determining that the first entity is redundant of the different entity;

storing relationship information in the relationship database indicating that the first entity does not exist in the graph database and corresponds to the different entity in the graph database;

the graph interaction interface retrieves, based on the query, the relationship information from the relationship database; and the graph database comprises a plurality of entities including the different entity and a second entity related to the different entity, and the graph database has a reduced graph database size and an increased graph database query speed due to the first entity being excluded from the graph database;

receiving a query result for the different entity and the second entity from the graph database based on the relationship information and at least one relationship between the different entity and the second entity that is indicated by the inherent structure of the graph database including a relationship edge linking nodes representing the different entity and the second entity, the query result including the historical data based on the at least one relationship; and modifying a user interface of an application based on the historical data.

11. The system of claim 10, wherein:

the historical data comprises historical payment data for the related entity;

the method further comprises determining a preferred payment method of the first entity from the historical payment data;

modifying the user interface by selecting the preferred payment method for an option of the user interface; and transmitting an invoice to the first entity the preferred payment method selected.

12. The system of claim 10, wherein querying the graph database comprises indicating the graph database to limit query results to information regarding entities of the plurality of entities associated with a first type, wherein the second entity is associated with the first type.

13. The system of claim 10, wherein querying the graph database comprises:

transmitting a query to an application programming interface (API) associated with the graph database, and receiving, at the application, query result from the API associated with the graph database.

14. The system of claim 10, wherein modifying the user interface comprises:

determining, based on the historical data, a transaction type having a shortest average time; and selecting the transaction type having the shortest average time for an option of the user interface.

15. The system of claim 10, wherein modifying the user interface comprises:

determining, based on the historical data, a transaction type having a greatest number of instances; and selecting the transaction type having the greatest number of instances for an option of the user interface.

16. The system of claim 10, wherein modifying the user interface comprises:

determining, based on the historical data, a transaction type having a highest amount; and selecting the transaction type having the highest amount for an option of the user interface.

17. The system of claim 10, wherein, each entity of the plurality of entities is associated with a type, the first entity is associated with a first type, the second entity is associated with a second type, and a first set of relationships between the first entity and other entities of the plurality of entities is different than a second set of relationships between second entity and other entities of the plurality of entities.

18. A method for user interface modification, comprising:

receiving entity information comprising a plurality of entities including information regarding a first entity associated with a first type and a second entity related to the first entity;

disambiguating the plurality of entities to determine a disambiguated entity;

storing the disambiguated entity in a graph database and excluding the first entity from the graph database based on determining that the first entity is redundant of the disambiguated entity;

storing relationship information in a relationship database indicating that the first entity does not exist in the graph database and corresponds to the disambiguated entity in the graph database;

generating a query including an indication to determine a related entity that is related to the first entity by using an inherent structure of the graph database and to retrieve historical data for the related entity in the graph database;

transmitting a query relating to the first entity to a graph interaction interface associated with the graph database and the relationship database, wherein:

the graph interaction interface retrieves, based on executing the query, the relationship information from the relationship database; and the graph database comprises a plurality of entities including the disambiguated entity and the second entity related to the disambiguated entity, and the graph database has a reduced graph database size and an increased graph database query speed due to the first entity being excluded from the graph database executing the query to receive a query result for the disambiguated entity and the second entity from the graph database based on the relationship information and at least one relationship between the disambiguated entity and the second entity that is indicated by the inherent structure of the graph database including a relationship edge linking nodes representing the disambiguated entity and second entity, the query result including the historical data based on the at least one relationship; and modifying a user interface of an application by selecting an option for the user interface based on the historical data.

\* \* \* \* \*